United States Patent
Son et al.

(10) Patent No.: US 9,601,220 B2
(45) Date of Patent: Mar. 21, 2017

(54) EARTHQUAKE-RESISTANT REINFORCEMENT ASSEMBLY

(71) Applicant: DOOSAN HEAVY INDUSTRIES & CONSTRUCTION CO., LTD., Changwon-si (KR)

(72) Inventors: Jung Dae Son, Gimhae-si (KR); Sung Hwan Kim, Changwon-si (KR); Yong Kyu Kim, Masan-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 196 days.

(21) Appl. No.: 14/365,207

(22) PCT Filed: Dec. 11, 2012

(86) PCT No.: PCT/KR2012/010730
§ 371 (c)(1),
(2) Date: Jun. 13, 2014

(87) PCT Pub. No.: WO2013/089407
PCT Pub. Date: Jun. 20, 2013

(65) Prior Publication Data
US 2014/0301523 A1    Oct. 9, 2014

(30) Foreign Application Priority Data

Dec. 16, 2011 (KR) .................. 10-2011-0136678
Dec. 10, 2012 (KR) .................. 10-2012-0142622

(51) Int. Cl.
*G21C 13/024* (2006.01)
*G21D 1/00* (2006.01)

(52) U.S. Cl.
CPC .............. *G21C 13/024* (2013.01); *G21D 1/00* (2013.01); *Y02E 30/40* (2013.01)

(58) Field of Classification Search
CPC .......... B21K 1/26; F04B 53/14; F04B 7/0069; F04B 9/02; A61B 2017/00473;
(Continued)

(56) References Cited

U.S. PATENT DOCUMENTS 1,130,831 A * 3/1915 Madell .................... F16B 2/246
                                                          248/410
1,962,126 A * 6/1934 Andersen ............. A47B 3/0815
                                                          403/65
(Continued)

FOREIGN PATENT DOCUMENTS

CN          1080767 A       1/1994
JP      2000-314415 A      11/2000
(Continued)

OTHER PUBLICATIONS

Communication from European Patent Office issued Jul. 23, 2015 in counterpart European Application No. 12857552.9.
(Continued)

*Primary Examiner* — Jack W Keith
*Assistant Examiner* — Lily C Garner
(74) *Attorney, Agent, or Firm* — Sughrue Mion, PLLC

(57) ABSTRACT

An earthquake-resistant reinforcement assembly according to one embodiment of the present invention comprises: a rod of which one end is hinge-coupled to an upper structure; a combination pin which is formed at the other end of the rod and is extended to diametrically cross the rod; and a bracket which is provided on a partition wall of a nuclear reactor containment building and is coupled with the other end, wherein the bracket can withstand a tensile load and a torsional load by including first and second members which face each other and are extended in parallel to load the rod thereon, and groove portions which are formed at the first (Continued)

and second members to be coupled with the combination pin to form the shape of a double bracket.

9 Claims, 4 Drawing Sheets

(58) Field of Classification Search
CPC .. A61B 2017/07278; A61B 2017/2923; A61B 17/6416; A61B 17/7032; A61B 17/705; A61B 17/707; A61B 19/0256; A61B 2017/00314; A61B 2017/00323
USPC ......... 16/149, 158, 169, 170, 172, 174, 175; 312/208, 20, 284; 220/315
See application file for complete search history.

(56) References Cited

U.S. PATENT DOCUMENTS

| | | | | |
|---|---|---|---|---|
| 2,236,044 A * | 3/1941 | Vanderveld | .......... | A47B 57/482 248/243 |
| 2,245,951 A * | 6/1941 | Agee | ........................ | A47C 9/06 108/48 |
| 2,497,337 A * | 2/1950 | Ackerman | .............. | E04F 10/08 16/259 |
| 3,087,192 A * | 4/1963 | Hertzke | ................ | E05D 7/1077 16/257 |
| 3,396,928 A * | 8/1968 | Lay | ...................... | A47B 3/0815 108/129 |
| 3,638,276 A * | 2/1972 | Vance | ....................... | E05D 5/06 312/208.6 |
| 4,809,552 A * | 3/1989 | Johnson | .................. | G01P 13/02 338/5 |
| 4,830,814 A * | 5/1989 | Altman | ................... | G21C 11/00 376/263 |
| 4,854,535 A * | 8/1989 | Winter | ................... | A47B 57/42 108/108 |
| 5,278,880 A * | 1/1994 | Baker | ...................... | G21C 1/09 376/285 |
| 2010/0098205 A1* | 4/2010 | Kang | ....................... | G21C 7/14 376/263 |

FOREIGN PATENT DOCUMENTS

| | | |
|---|---|---|
| JP | 2011122845 A | 6/2011 |
| KR | 1984-0002080 B1 | 11/1984 |
| KR | 2000-0074957 A | 12/2000 |
| KR | 10-0300890 B1 | 10/2001 |
| KR | 10-0844439 B1 | 7/2008 |
| WO | 2012/009130 | 11/2012 |

OTHER PUBLICATIONS

Office Action issued by the Chinese Patent Office for the corresponding Chinese patent application No. 201280062098.2.
International Search Report for PCT/KR2012/010730 dated Mar. 15, 2013.

* cited by examiner

EARTHQUAKE-RESISTANT REINFORCEMENT ASSEMBLY

TECHNICAL FIELD

The embodiments of the present invention relates to an assembly capable of supporting a nuclear reactor upper structure when an earthquake occurs.

BACKGROUND ART

In general, nuclear reactor refers to an apparatus for controlling a chain reaction to momentarily dissipate a large amount of mass defect energy as a result of chain nuclear fission reaction to use thermal energy created by nuclear fission as power.

An earthquake may occur in at least partial region where a nuclear reactor is installed, and an earthquake-resistant reinforcement assembly capable of preventing any risk of the structure of the reactor from being destroyed or damaged when a potentially large magnitude earthquake occurs may be taken into consideration.

As we have seen from the case of recently occurred reactor damage due to an earthquake, the earthquake-resistant design requirements of a nuclear reactor may be further reinforced, and thus a means capable of safely supporting the structure of the reactor even during larger scale earthquakes may be taken into consideration.

DISCLOSURE OF THE INVENTION

An object of the present disclosure is to provide an earthquake-resistant reinforcement assembly having a further enhanced structure.

In order to accomplish the foregoing technical task, an earthquake-resistant reinforcement assembly according to an embodiment of the present disclosure may include a rod an end of which is hinge-coupled to the upper structure, a coupling pin formed at the other end of the rod, and extended to diametrically cross the rod, and a bracket installed at a partition wall of a nuclear reactor containment building, and coupled to the other end thereof, wherein the bracket includes a first and a second member extended in parallel to face each other so as to allow the rod to be placed therewithin, and groove portions formed on the first and the second member, respectively, to be coupled to the coupling pin.

As an example associated with the present disclosure, both lateral surfaces constituting the groove portions may be formed to be inclined by 5 to 20 degrees toward the upper structure from the vertical surface thereof.

As an example associated with the present disclosure, the groove portions may be formed to increase an area of the cross-section thereof as they go inside so as to increase an area in contact with the coupling pin.

As an example associated with the present disclosure, the groove may include a first and a second surface facing each other, and the area of the first surface adjacent to the upper structure may be formed to be greater than that of the second surface.

As an example associated with the present disclosure, an upper portion of the bracket may be open and a lower portion thereof may be closed, and the lower portion of the first and the second member may be expanded in the thickness compared to the upper portion thereof to support the upper structure during the torsional behavior of the upper structure.

According to an earthquake-resistant reinforcement assembly having the foregoing configuration associated with at least one embodiment of the present disclosure, the bracket may be designed in a double bracket shape, thereby withstanding its tensile and torsional load.

MODES FOR CARRYING OUT THE PREFERRED EMBODIMENTS

Figure 1:
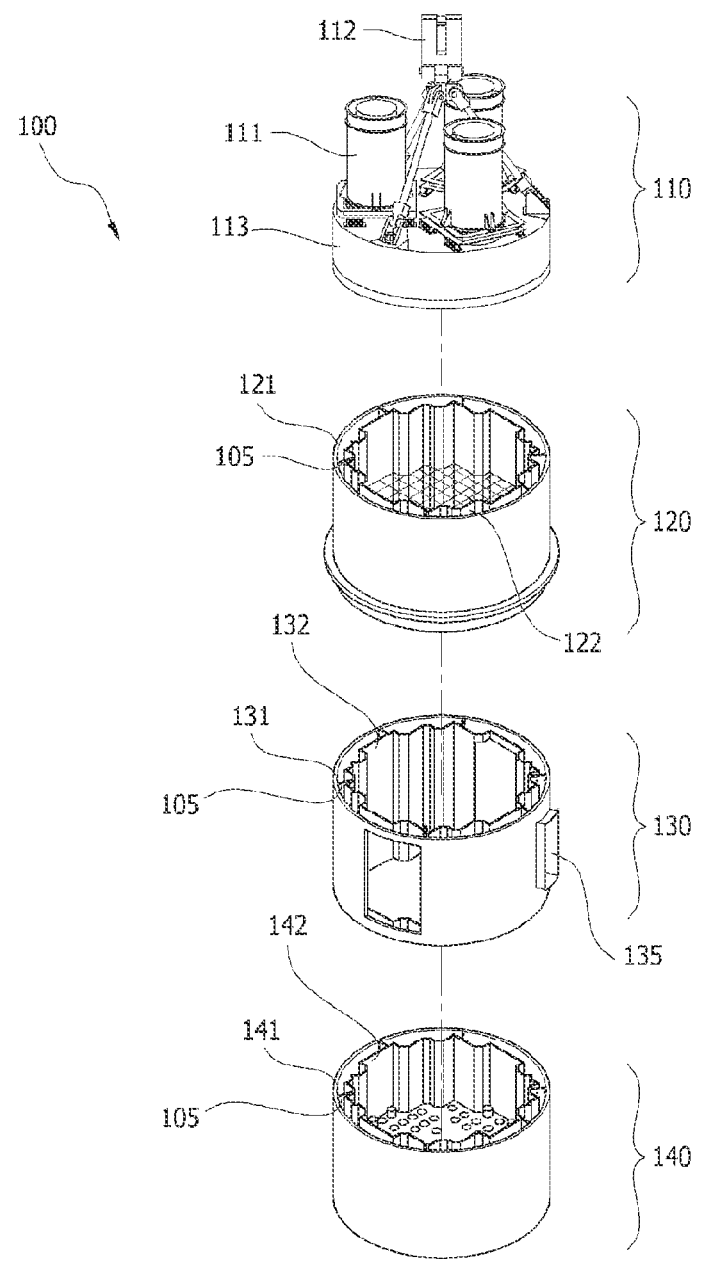
FIG. 1 is an exploded perspective view illustrating the schematic configuration of an integrated nuclear reactor upper structure according to an embodiment of the present disclosure.

Hereinafter, an earthquake-resistant reinforcement assembly associated with the present disclosure will be described in more detail with reference to the accompanying drawings. A suffix "module" or "unit" used for constituent elements disclosed in the following description is merely intended for easy description of the specification, and the suffix itself does not give any special meaning or function. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

In general, nuclear reactor is an apparatus using a large amount of mass defect energy produced as a result of nuclear fission reaction. Unlike a thermal power furnace in which combustion is automatically expanded by the heat of combustion, a nuclear reactor performs a nuclear fission reaction using neutrons emitted during the nuclear fission of fuel as a mediator.

Nuclear fission reaction in a nuclear reactor can be adjusted by controlling the number of neutrons absorbed by nuclear fuel, but in order to sustain nuclear fission within a nuclear reactor, the number of neutrons emitted during the nuclear fission, which are reabsorbed by nuclear fuel to cause nuclear fission again, should be at least one or more. If the number is one, nuclear fission reaction is maintained constant with no increase or decrease, and this state is referred to as reactor criticality. Furthermore, when the number exceeds one, the number of nuclear fission reactions gradually increases which is called a supercritical state or vise versa which is called a subcritical state.

In general, when the reactor is operated at constant output, it is used a method of operating the reactor in a critical state or slightly supercritical state to absorb extra neutrons to the control rod. Though the number of neutrons emitted from one nuclear fission is about two in average in case of uranium-235, all of them do not contribute to nuclear fission again and the number thereof is reduced due to leakage out of the reactor, absorption to non-fissionable materials or the like, and thus it is important to minimize the loss of neutrons to continuously operate the reactor. For a method of preventing the loss of neutrons, there exist a method of enhancing the probability of absorption by increasing the amount of fissionable materials or slowing down high-speed neutrons to a thermal neutron level, a method of sufficiently increasing the size of the reactor to minimize the amount of leakage out of the core, a method of minimizing absorption to other non-fissionable materials, and the like. Neutrons emitted at the moment of fission as high-speed neutrons with high energy have a very low probability of absorption to nuclear fuel, and thus it is important to slow them down to increase the probability of absorption. For the control of the reactor, materials having a large neutron absorption cross-section such as cadmium, boron or the like are inserted into or removed from the core to adjust and control the number of neutrons, and a method of changing the amount of the reflector or moderator may be also used.

Hereinafter, an embodiment of the present disclosure will be described in more detail with reference to the accompanying drawings.

Referring to FIG. 1, an integrated nuclear reactor upper structure 100 may include a fan module 110, an upper module 120, a central module 130, and a lower module 140.

Referring to FIG. 1, the fan module 110 is located at an upper portion of a nuclear reactor head, wherein a cooling fan 111, a lifting structure 112 and an air plenum 113 may be formed in an integrated manner. The upper module 120 may be coupled to a lower portion of the air plenum 113. The cooling fan 111 as a device for efficiently performing cooling within the nuclear reactor upper structure 100 adjusts the flow path of air which will be described later. The lifting structure 112 may be formed with a tripod and a shackle, and the tripod is to lift the entire integrated upper structure 100, and a crane 300 is connected to the shackle connected to an upper end of the tripod to perform a lifting operation. The air plenum 113 may support the cooling fan 111 and the lifting structure 112, and be formed in an integrated manner. A ring beam is provided to be coupled to a lower end of the air plenum 113 in a horizontal direction, and the upper module 120 may be coupled to a lower end of the ring beam.

Referring to FIG. 1, an upper shroud plate 121 cylindrically formed to allow the top and the bottom thereof to be open, and an upper baffle 122 fixed to be separated by a predetermined distance along an inner circumferential surface of the upper shroud plate 121 to form the flow path of air are formed within the upper module 120. For the central module 130 and the lower module 140, a central shroud plate 131 and a central baffle 132, and a lower shroud plate 141 and a lower baffle 142 are formed in a similar manner to those of the upper module 120. However, an air inlet port 135 may be preferably provided at the central module 130 to pass through both the central shroud plate 131 and central baffle 132.

Referring to FIG. 1, the shroud plates 121, 131, 141 are formed to surround the outside of the baffles 122, 132, 142 to perform the role of a cover for protecting a structure provided within each module. The shroud plates 121, 131, 141 and the baffles 122, 132, 142 are preferably fixed to a support column 105 formed in a vertical direction such that an end thereof is coupled to an upper end of the upper module 120 and the other end thereof is coupled to a lower end of the lower module 140. The support column 105 is a structure for supporting the nuclear reactor upper structure 100 in a vertical direction and an H-beam may be used to maintain the rigidity. A control rod driving device and a control rod may be preferably provided within the lower baffle 142.

The flow of air generated by the cooling fan 111 inhales air through the air inlet port 135 and the inhaled air moves through a flow space between the baffles 122, 132, 142 and the shroud plates 121, 131, 141, thereby facilitating the cooling of the control rod driving device and reactor head.

The nuclear reactor upper structure 100 provided at an upper portion of the reactor head has a function of lifting the control rod driving device and reactor head when nuclear fuel is replaced. The control rod driving device provided within the lower module 140 is a device for allowing the control rod for controlling a nuclear reaction rate of the reactor core to be inserted into or drawn out. The control rod driving device may have a tube shape in which honeycomb shaped spaces are perforated to allow a plurality of control rods to be inserted thereinto or released therefrom. The control rod adjusts a nuclear reaction rate of the reactor core while moving in a vertical direction in the state of being inserted into the control rod driving device. A control rod position indicator sensor for sensing the position of the control rod may be provided in the control rod driving device, and a power source for driving the control rod may be contained therein.

There are many cases where an operation associated with the control rod driving device is required for the nuclear reactor upper structure 100, including a power source replacement for driving a control rod, a repair and maintenance work, a replacement of a control rod position indicator sensor, a calibration work during the installation of a control rod position indicator sensor, and the like. In the related art, in order to perform a work associated with the control rod driving device, the cooling fan 111, the lifting structure 112 and the air plenum 113 are sequentially separated to be first lifted, and a cable support unit provided therebelow is disassembled and removed and then the baffles 122, 132, 142 and the shroud plates 121, 131, 141 should be separated therefrom. A work for dismantling to separate or remove individual constituent devices of the nuclear reactor upper structure 100 one by one in this manner has a problem in which first, the work is time and labor consuming and thus inefficient, and second, it has a risk of components being deformed or damaged during the process of dismantling the constituent devices, and third, it has difficulty in assembly during the process of completing a work associated with the control rod driving device and then performing the reassembly due to the deformation or damage of components during the dismantling process. In order to compensate for the foregoing problem, an integrated head assembly (IHA) formed with the fan module 110, the upper module 120, the central module 130 and the lower module 140 in an integrated manner is used.

Figure 2:
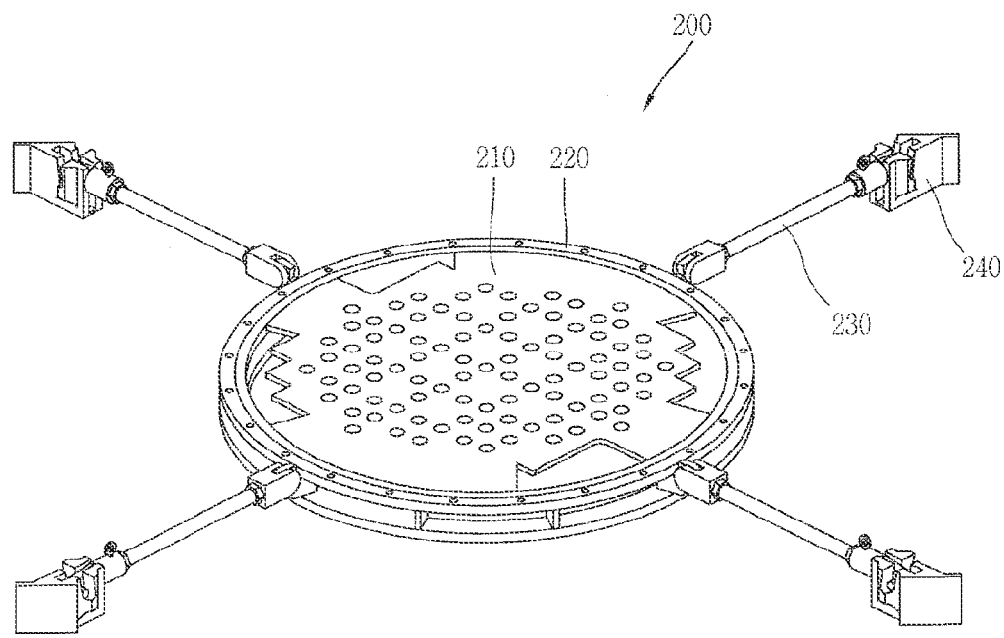
FIG. 2 is a conceptual view illustrating a configuration in which an earthquake-resistant support plate, an earthquake-resistant support ring, a rod and a bracket are combined according to an embodiment of the present disclosure.
Figure 3:
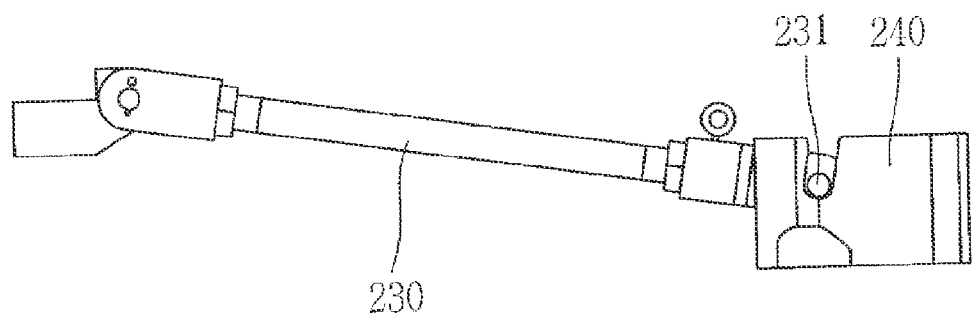
FIG. 3 is a conceptual view illustrating a configuration in which the rod and bracket in FIG. 2 are combined by a coupling pin.

FIG. 2 is a conceptual view illustrating a configuration in which an earthquake-resistant support plate, an earthquake-resistant support ring, a rod and a bracket are combined according to an embodiment of the present disclosure, and FIG. 3 is a conceptual view illustrating a configuration in which the rod and bracket in FIG. 2 are combined by a coupling pin 231.

As illustrated in the drawing, the earthquake-resistant reinforcement assembly may include a rod 230 and a bracket 240.

An end of the rod 230 is hinge-coupled to the upper structure 100. More specifically, it is coupled to an earthquake-resistant support ring 220 formed to surround the earthquake-resistant support plate 210. The earthquake-resistant support plate 210 is included in the upper structure 100 to constitute part of the upper structure 100. At least any one of the earthquake-resistant support plates 210 may be disposed between the fan module 110, the upper module 120, the central module 130, and the lower module 140.

At least three or more rods 230 are formed along the earthquake-resistant support ring 220. Preferably, four rods 230 may be disposed at intervals of 90 degrees along the earthquake-resistant support ring 220. The earthquake-resistant support ring 220 and the rod 230 are hinge-coupled and formed to be revolved based on a hinge shaft. An end of the rod 230 is hinge-coupled, and the other end thereof is coupled to the bracket 240.

A coupling pin 231 extended to diametrically cross the rod 230 is formed at the other end of the rod 230 coupled to the bracket 240.

Furthermore, the rod 230 is coupled to the bracket 240. The rod 230 may be formed to increase or decrease the length thereof. In other words, the rod is formed to include a plurality of bodies provided with hollow holes, respectively, and for example, may be formed to slidably move while any one of bodies is inserted into a hole formed on another body like bodies constituting a fishing rod.

In other words, the rod may be formed with multiple length-adjustable bodies to increase or decrease the length of the rod, wherein any one body is drawn in or out with respect to another body, and the bodies are fixed to one another in the state of being drawn in or out. At this time, each of the bodies is formed to be gradually tapered from one side to the other side.

The bracket 240 may be formed to be open in the upward direction and closed in the downward direction. In other words, the bracket is formed to support the load of the rod coupled thereto, and to this end, it has a structure of being closed in the downward direction. Furthermore, the bracket has a structure of being open in the upward direction such that the rod is rotated around one side of the rod coupled to the upper structure 100 so as to be coupled to the bracket. Due to this, the rod may be easily detachable from the bracket.

One surface 246 of the bracket is fixed to a partition wall of the nuclear reactor containment building. One surface 246 of the bracket can be fixed to a partition wall of the nuclear reactor containment building by welding, but for example, the bracket may be also fixed to a partition wall of the nuclear reactor containment building by inserting a fastening means to pass through the bracket and partition wall using the fastening means such as a screw.

Figure 4A:
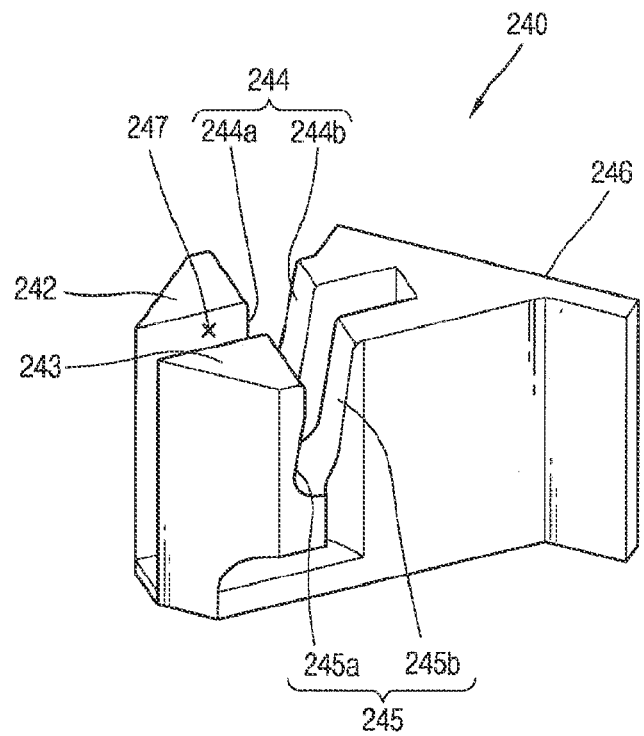
FIGS. 4A through 4C are a perspective view, a plan view and a side view illustrating the bracket according to an embodiment of the present disclosure.
Figure 4B:
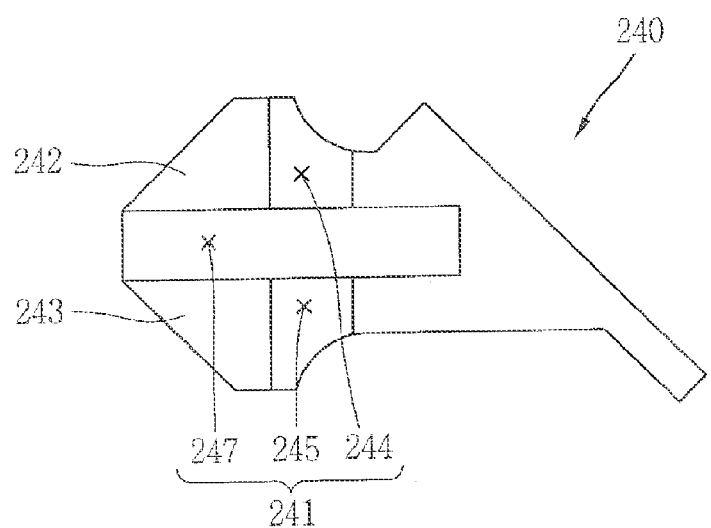
Figure 4C:
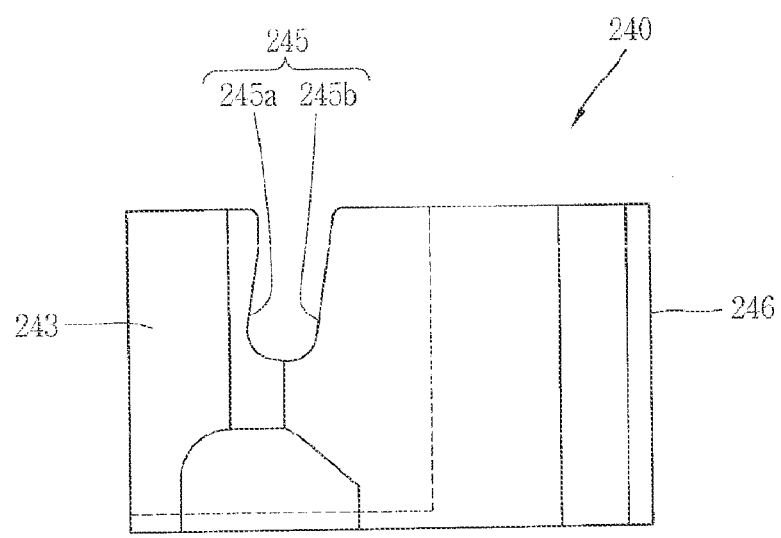

FIGS. 4A through 4C are a perspective view, a plan view and a side view illustrating the bracket 240 according to an embodiment of the present disclosure.

The bracket 240 should be installed not to interfere with peripheral devices such as a nuclear fuel loader, an upper guide structure, and the like. Furthermore, the bracket 240 should be designed by taking the thermal expansion of the nuclear reactor, nuclear reactor upper structure 100, and the like into consideration. Accordingly, part of the bracket 240 brought into contact with the rod 230 may be formed to have the same thermal expansion coefficient as that of the rod 230.

The bracket 240 according to the present disclosure is designed to withstand a tensile load, and a pin contact area is increased to the maximum to disperse the stress distribution. Furthermore, the size of the bracket 240 is minimized to avoid interference with peripheral devices, and designed with a double bracket shape having a first member and a second member formed to face each other to maintain more than a predetermined strength. Here, the lower portions of the first and the second member are connected to each other to increase the thickness to prevent the torsion of the double bracket.

As seen from the upper surface, the bracket 240 has a crisscross shaped opening portion 241. In other words, the opening portion 241 may include a groove 247 formed in a horizontal direction and grooves 244, 245 formed in a vertical direction, wherein the rod 230 is mounted on the groove 246 formed in a horizontal direction, and the coupling pin 231 is mounted on the grooves 244, 245 (hereinafter, referred to as groove portions) formed in a vertical direction.

A first member 242 and a second member 243 may form both lateral walls of the groove 247 formed in a horizontal direction. The first member 242 and second member 243 are extended in parallel to face each other.

The first member 242 and second member 243 include groove portions 244, 245, respectively. Both lateral surfaces defining the groove portions 244, 245 may be formed to be inclined at a predetermined angle toward the upper structure 100 from a vertical surface thereof. For example, the predetermined angle may be 5 to 20 degrees. Due to this, the first member 242 and second member 243 may support the upper structure 100 during the longitudinal directional (vertical directional) behavior of the upper structure 100.

According to the test result, it is seen that they are vulnerable to the longitudinal behavior when less than 5 degrees, and vulnerable to the transverse behavior when greater than 20 degrees.

The groove portions 244, 245 are formed to increase the cross-sectional area thereof as they go inside so as to disperse stress. The groove portions 244, 245 may include first surfaces 244a, 245a and second surfaces 244b, 245b facing each other, and the area of the first surfaces 244a, 245a adjacent to the upper structure 100 may be formed to be greater than that of the second surfaces 244b, 245b, thereby supporting the upper structure 100 during the transverse directional (horizontal directional) behavior of the upper structure 100.

The configurations and methods according to the above-described embodiments will not be applicable in a limited way to the foregoing earthquake-resistant reinforcement assembly, and all or part of each embodiment may be selectively combined and configured to make various modifications thereto.

The embodiments of the present disclosure may be applicable to an earthquake-resistant reinforcement assembly formed to support a nuclear reactor upper structure.

The invention claimed is:

1. An earthquake-resistant reinforcement assembly formed to support the longitudinal and transverse directional behavior of a nuclear reactor upper structure when an earthquake occurs, comprising:
   a rod an end of which is hinge-coupled to the upper structure;
   a coupling pin formed at the other end of the rod, and extended to diametrically cross the rod; and
   a bracket installed at a partition wall of a nuclear reactor containment building, and coupled to the other end thereof,
   wherein the bracket comprises:
      a first and a second member extended in parallel to face each other so as to allow the rod to be placed therewithin; and
      groove portions formed on the first and the second member, respectively, to be coupled to the coupling pin, wherein lateral surfaces constituting each of the groove portions are formed to be inclined at a predetermined angle toward the upper structure from a vertical surface thereof, wherein inclinations of at least one of the lateral surfaces for each of the groove portions begin at openings of the groove portions, and wherein the groove portions are formed so that cross-sectional areas of the groove portions increase as the groove portions extend away from the openings so as to increase an area in contact with the coupling pin in an axial direction of the coupling pin.

2. The earthquake-resistant reinforcement assembly of claim 1, wherein both of the lateral surfaces constituting the groove portions are formed to be inclined by 5 to 20 degrees toward the upper structure from the vertical surface thereof.

3. The earthquake-resistant reinforcement assembly of claim 1, wherein the groove portions comprise a first and a second surface facing each other, and the area of the first surface adjacent to the upper structure is formed to be greater than that of the second surface.

4. An earthquake-resistant reinforcement assembly formed to support the longitudinal and transverse directional behavior of a nuclear reactor upper structure when an earthquake occurs, comprising:
 a rod an end of which is hinge-coupled to the upper structure;
 a coupling pin formed at the other end of the rod, and extended to diametrically cross the rod; and
 a bracket installed at a partition wall of a nuclear reactor containment building, and coupled to the other end thereof,
 wherein the bracket comprises:
  a first and a second member extended in parallel to face each other so as to allow the rod to be placed therewithin; and
  groove portions formed on the first and the second member, respectively, to be coupled to the coupling pin,
 wherein an upper portion of the bracket is open and a lower portion thereof is closed, and the lower portion of the first and the second member is expanded in the thickness compared to the upper portion thereof to support the upper structure during the torsional behavior of the upper structure,
 wherein lateral surfaces constituting each of the groove portions are formed to be inclined at a predetermined angle toward the upper structure from a vertical surface thereof,
 wherein inclinations of at least one of the lateral surfaces for each of the groove portions begin at openings of the groove portions, and
 wherein the groove portions are formed so that cross-sectional areas of the groove portions increase as the groove portions extend away from the openings so as to increase an area in contact with the coupling pin in an axial direction of the coupling pin.

5. The earthquake-resistant reinforcement assembly of claim 4, wherein the groove portions comprise a first and a second surface facing each other, and the area of the first surface adjacent to the upper structure is formed to be greater than that of the second surface.

6. The earthquake-resistant reinforcement assembly of claim 4, wherein both of the lateral surfaces constituting the groove portions are formed to be inclined by 5 to 20 degrees toward the upper structure from the vertical surface thereof.

7. The earthquake-resistant reinforcement assembly of claim 1, wherein the rod is rotated around the end of the rod which is hinge-coupled to the upper structure so as to have the other end coupled to the bracket.

8. The earthquake-resistant reinforcement assembly of claim 1, wherein the bracket is installed at the partition wall by welding.

9. The earthquake-resistant reinforcement assembly of claim 1, wherein the rod is formed with plurality of length-adjustable bodies to allow adjustment to the length of the rod.

* * * * *